(12) United States Patent
Zhou et al.

(10) Patent No.: US 8,990,157 B2
(45) Date of Patent: Mar. 24, 2015

(54) REPLICATION SUPPORT FOR STRUCTURED DATA

(75) Inventors: Ping Zhou, Shanghai (CN); Stephen Shepherd, Lakewood, CO (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 13/299,931

(22) Filed: Nov. 18, 2011

(65) Prior Publication Data

US 2012/0317078 A1   Dec. 13, 2012

Related U.S. Application Data

(60) Provisional application No. 61/494,240, filed on Jun. 7, 2011.

(51) Int. Cl.
*G06F 17/30* (2006.01)

(52) U.S. Cl.
CPC .................. *G06F 17/30575* (2013.01)
USPC ....................................... 707/634

(58) Field of Classification Search
CPC ................................................ G06F 17/30575
USPC .................. 707/634, 638, 714, 770
See application file for complete search history.

(56) References Cited

U.S. PATENT DOCUMENTS

| | | | | |
|---|---|---|---|---|
| 7,287,218 | B1 * | 10/2007 | Knotz et al. | 715/209 |
| 7,555,493 | B2 * | 6/2009 | Khayter et al. | 1/1 |
| 7,596,658 | B2 * | 9/2009 | Tsurudome | 711/112 |
| 7,853,573 | B2 * | 12/2010 | Warner et al. | 707/693 |
| 7,953,698 | B2 * | 5/2011 | Beck et al. | 707/610 |
| 7,962,844 | B2 * | 6/2011 | Knotz et al. | 715/209 |
| 8,214,353 | B2 * | 7/2012 | Inturi et al. | 707/715 |
| 8,566,280 | B2 * | 10/2013 | Inturi et al. | 707/634 |
| 8,639,677 | B2 * | 1/2014 | Pruet, III | 707/703 |
| 2002/0152289 | A1 * | 10/2002 | Dube | 709/220 |
| 2004/0111666 | A1 * | 6/2004 | Hollcraft | 715/503 |
| 2006/0190497 | A1 * | 8/2006 | Inturi et al. | 707/201 |
| 2007/0011175 | A1 * | 1/2007 | Langseth et al. | 707/100 |
| 2007/0260650 | A1 * | 11/2007 | Warner et al. | 707/204 |
| 2007/0283089 | A1 * | 12/2007 | Tsurudome | 711/114 |
| 2007/0299853 | A1 * | 12/2007 | Knotz et al. | 707/10 |
| 2008/0034014 | A1 * | 2/2008 | Beck et al. | 707/204 |
| 2008/0162446 | A1 * | 7/2008 | Dettinger et al. | 707/4 |
| 2010/0030824 | A1 * | 2/2010 | Shang et al. | 707/204 |
| 2012/0310886 | A1 * | 12/2012 | Inturi et al. | 707/634 |
| 2012/0317073 | A1 * | 12/2012 | Zhou et al. | 707/610 |
| 2013/0132345 | A1 * | 5/2013 | Chen et al. | 707/635 |

\* cited by examiner

*Primary Examiner* — Sheree Brown

(74) *Attorney, Agent, or Firm* — Sterne, Kessler, Goldstein & Fox P.L.L.C.

(57) ABSTRACT

A method, system and computer readable storage medium for replicating structured data stored in a database. The method includes identifying the stored structured data, mapping the data to an unstructured data type, and sending the mapped data to one or more replicate databases as unstructured data.

23 Claims, 6 Drawing Sheets

REPLICATION SUPPORT FOR STRUCTURED DATA

CROSS REFERENCE TO RELATED APPLICATION

This application claims the benefit under 35 U.S.C. §119 (e) of U.S. Provisional Patent Application No. 61/494,240, filed on Jun. 7, 2011, which is herein incorporated by reference in its entirety.

BACKGROUND OF THE INVENTION

1. Field of the Invention

The invention relates generally to databases and more specifically to supporting replication of data stored as structured data in a database.

2. Related Art

Databases have long been used to store the vast amounts of information required by modern companies, educational institutions, governments, and the like. Most modern database systems are de-centralized in that they include several databases that are separated functionally and geographically. One approach for organizing the several databases is to have a primary database and one or more replicate databases that contain mirror copies of the data contained on the primary database. When the content of the primary database is changed, that change must be "replicated" in the replicate databases in order to ensure the integrity of the mirror copies.

Given the large amount of data normally stored on a given database, it is frequently infeasible to replicate the data contained on the primary database by simply copying the entire content of the primary database to the replicate databases. Instead, data replication is accomplished using log-based technology. Through the use of log-based replication, changes to the data in the primary database are captured in a transaction log.

A replication agent can be used to read the primary database's transaction log and propagate the changes to the replicate databases. After replication, each replicate database contains accurate and current copies of the subsets of data found in the primary database. However, not all tables in the primary database may be replicated. Instead, only when a table in the primary database is marked for replication, replication agent replicates transactions that manipulate the marked table.

Many databases have a native structured data type that lets the database understand that a column or table contains structured data. In many ways, this is similar to the way that, for instance, date and timestamp data types allow a database to understand that a column contains a date. Additionally, the structured data type may provide or be associated with methods that allow common operations such as schema validation and transformation of content. These data types can be used like any other data type and can be used, for instance, when (a) creating a column in a relational table; (b) declaring PL/SQL (Procedural Language/Structured Query Language) variables; and (c) defining and calling PL/SQL procedures and functions. One example of such a structured data type is the extensible markup language (XML) type. In addition to the functionality outlined above, the XML type allows a user to create a table of XML type. Such a table or column can, by default, contain any well-formed XML document.

Many databases that support the XML type perform a XML data validation check prior to replication in order to ensure the data contains a well-formed XML document. If the data is a fall well-formed XML document, then it will pass validation. However, when less than a complete XML document is to be replicated (as could be the case with log-based replication), a validation error occurs. As noted above, it is frequently desirable, or even necessary, to replicate less than a full XML document. Therefore, what is needed are systems, methods, and computer program products that allow a replication agent to facilitate replication of structured data that may or may not constitute a full and well-formed structured document.

BRIEF SUMMARY OF THE INVENTION

Embodiments of the invention include systems, methods and computer-readable mediums for supporting replication of data stored in a column of structured data type in a first database by a replication agent. According to embodiments of the present invention, a method of replicating data stored as a structured data type from a primary data base to one or more replicate databases is provided. According to the method, structured data type data that is to be replicated from a primary to a replicate database is identified. The structured data is mapped to an unstructured data type. The to-be replicated data is then sent to the replicate database as an unstructured data type, which allows validation processes to be bypassed in the cases where the original structured content is not well-formed.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
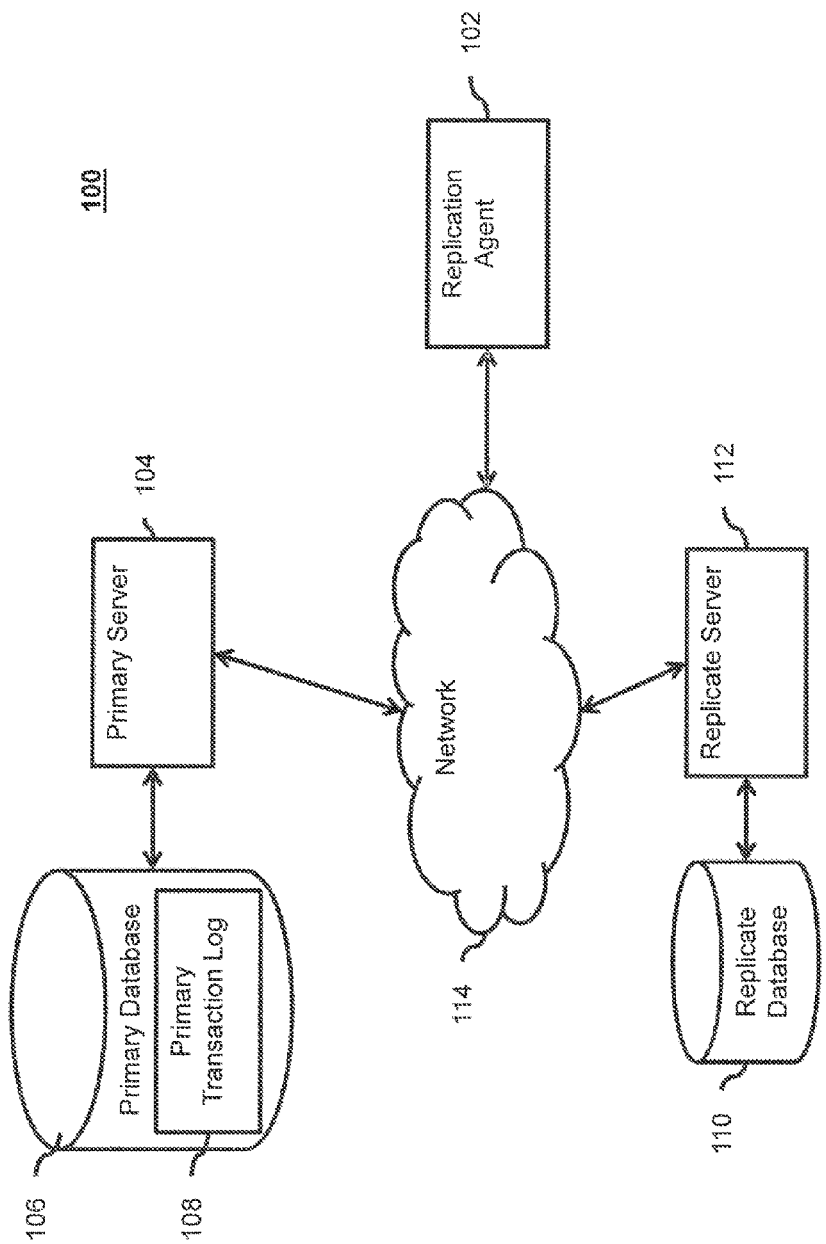
FIG. 1 is a block diagram of a database replication system according to an embodiment of the invention.

Embodiments of the invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

FIG. 1 is a block diagram of an exemplary database replication system 100. Database replication system 100 includes a primary database 106, a replication agent 102, a replication server 112, and one or more replicate databases 110. Database replication system 100 may also include a primary server 104.

Primary database 106 may be any type of a database and may include, but is not limited to, a device having a processor and a memory for executing and storing instructions. Primary database 106 may include software, firmware and hardware or any combination thereof. The software may include one or more applications that create, delete and modify database tables and the data stored in those tables. The hardware may include a processor and memory.

Primary database 106 includes tables and schemas. Primary database 106 receives transactions from a user or another computing device that may act on the tables and schemas. Those transactions also store, retrieve, modify, and manipulate data stored in primary database 106. The primary database 106 may be connected to network 114 via primary server 104 according to embodiments of the present invention. According to alternative embodiments, the primary database 106 may be connected to network 114 directly.

Database replication system 100 replicates transactions in primary database 106 to replicate databases 110. To do so, the replication agent 102 marks tables in primary database 106 that include transactions that are captured for replication. Once tables are marked for replication, transaction log 108 stores the record of the transactions that manipulate the marked tables.

Primary database transaction log 108 may take any suitable form for storing transactions marked for replication and other changes to the database, such as a text log, a database table, etc. Primary database transaction log 108 may be created and/or maintained by primary database 106, a primary server 104, replication agent 102, or another suitable computing device or process.

Replication agent 102 replicates transactions for tables and schemas marked for replication in primary database 106. To replicate each transaction, replication agent 102 scans transaction log 108 for the relevant transaction. When replication agent 102 identifies each transaction in transaction log 108, it communicates those transactions to replication server 112. Replication agent 102 may be a stand-alone application that is independent of primary database 106, replication server 112 or other components in database replication system 100. Replication agent 102 may also execute on the same or different computing device as primary database 106.

Replication server 112 receives and processes transactions and data received from replication agent 102. Replication server 112 disseminates those transactions to replicate databases 110 or other replication servers 112. When replication server 112 receives transactions from replication agent 102, it delivers those transactions to replicate databases 110, where they are processed. In an embodiment, replication agent 102 provides instructions to replication server 112 for disseminating replicated transactions to replicate databases 110.

Replication server 112 may guarantee the transaction delivery. When transaction delivery is guaranteed, each transaction successfully received from replication agent 102 is guaranteed for delivery to an appropriate replicate database 110.

Replicate database 110 receives transactions from replication server 112 and updates the tables and data with the content included in the transactions. When transactions are successfully processed by replicate database 110, the state of the tables included in replicate database 110 is the same as that of the associated tables marked for replication on primary database 106.

Database replication system 100 may also include a network 114. The network may be any type of a network or combination of networks such as, but not limited to, a local area network, wide area network or the Internet. Network may be any form of a wired network or a wireless network, or a combination thereof. Network allows primary database 106, replication agent 102, replication server 112 and replication database 110 to communicate among each other, as well as other modules and components.

Similar to that described above, partial or full replication of data from one database to one or more separate database may involve a replication agent and a replication server. A replication agent may capture changes made to a database. A replication server may distribute the changes captured by the replication agent to the separate databases. The replication agent may convert the changes and transactions captured into a format that the replication server can interpret.

Figure 2:
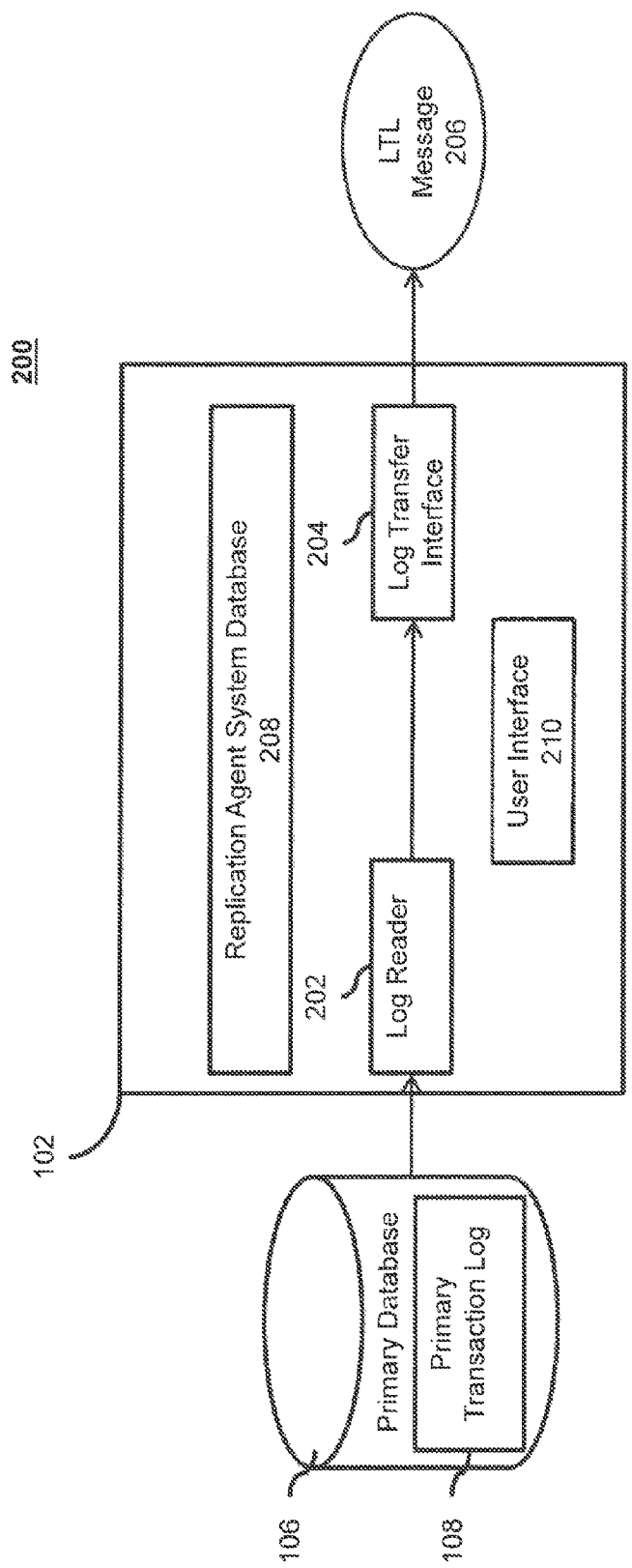
FIG. 2 is a block diagram of a of replication agent according to an embodiment of the invention.

FIG. 2 is a block diagram of an exemplary embodiment 200 of replication agent 102. Elements of the invention may be implemented using, for example, the Sybase Replication Agent product from Sybase, Inc. of Dublin, Calif. However, the invention is not limited to this example implementation. As described herein, replication agent 102 captures transactions from primary database 106 and replicates those transactions to replication server 112. In this embodiment, replication agent 102 further includes a log reader 202, a log transfer interface 204, a replication agent system database (RASD) 208 and a user interface 210. Log reader 202 retrieves transactions from primary database transaction log 108 in primary database 106 and generates a change data set. Log reader 202 passes the change data set to log transfer interface 204.

Log transfer interface 204 receives the change data set from log reader 202. Log transfer interface 204 can use, for example, the well-known log transfer language (LTL) to encapsulate the change data set into an LTL message 206. Once LTL message 206 is generated, log transfer interface 204 sends LTL message 206 to primary replication server 112.

Typically, database columns have an assigned data type, such as a Boolean data type, integer data type, string data type, or any other data type. Additionally, data may be stored in a structured data type such as XML.

Figure 3:
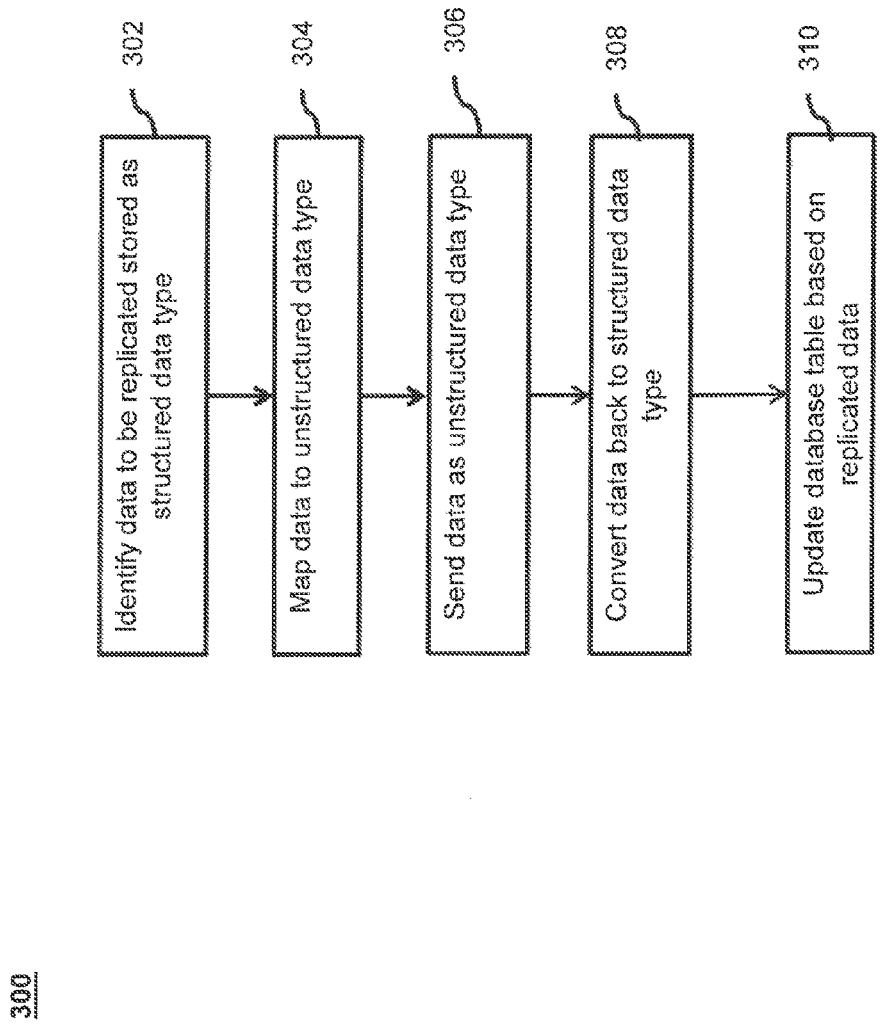
FIG. 3 is a flow chart representing replicating structured data from a primary database to a replicate database according to an embodiment of the invention.

FIG. 3 is a diagram of a method 300 for replicating structured data according to embodiments of the present invention. According to some embodiments of the invention, method 300 may be implemented by a replication agent such as replication agent 102.

As is shown in FIG. 3, at step 302, structured data to be replicated is identified in the primary database. According to some embodiments, the structured data to be replicated is identified by being marked for replication. For instance, if the primary database contains XML data (i.e., a structured data type) that needs to be replicated, that data can be marked so that it is identified for replication. According to other embodiments of the invention, the replication agent 102 can perform a check using well known means to determine whether data to be replicated is structured data or not.

Once the structured data has been identified, it is mapped to an unstructured data type such as text or character large object (CLOB) type at step 304. According to some embodiments of the invention, the mapping step takes the form of generating a replication definition correlating the structured data type to the unstructured data type. This replication definition can be automatically generated during the replication procedure. According to other embodiments of the invention, the mapping step may include converting the structured data to unstructured data. This conversion of data can result in the structured data being stored in a data column of an unstructured type. For example, the characters in a XML document could be saved as characters in a CLOB type column of a table. In some instances, a column of structured data may include two sub-columns of data: one that contains the structured data and a second "hidden" column of an unstructured data type. According to some embodiments of the invention, the mapping step may include storing the structured data in the second hidden column prior to replicating it.

The data to be replicated can then be sent to the replicate server 112 as the unstructured data type for dissemination to one or more replicate databases 110 at step 306. According to embodiments of the present invention, the data can be sent to the replicate server as an LTL message. Additionally, according to some embodiments of the present invention, the data may be sent directly to the replicate databases.

According to some embodiments of the present invention, the unstructured data can then be converted back to the structured data at step 308 and then the replicate database updated based on the replicated data at step 310. According to some embodiments of the invention, the unstructured data can be converted back to structured data by saving the unstructured data in a structured data type table in the replicate database. A person of ordinary skill in the art would understand that the step 308 of converting the data unstructured data back to structured data may be omitted if, for instance, the replicate server database 110 does not support the structured data type or in the case where the original structured content is not well-formed. In this case, the replicate database is simply updated based on the replicate data that is stored in as an unstructured data type.

Figure 4:
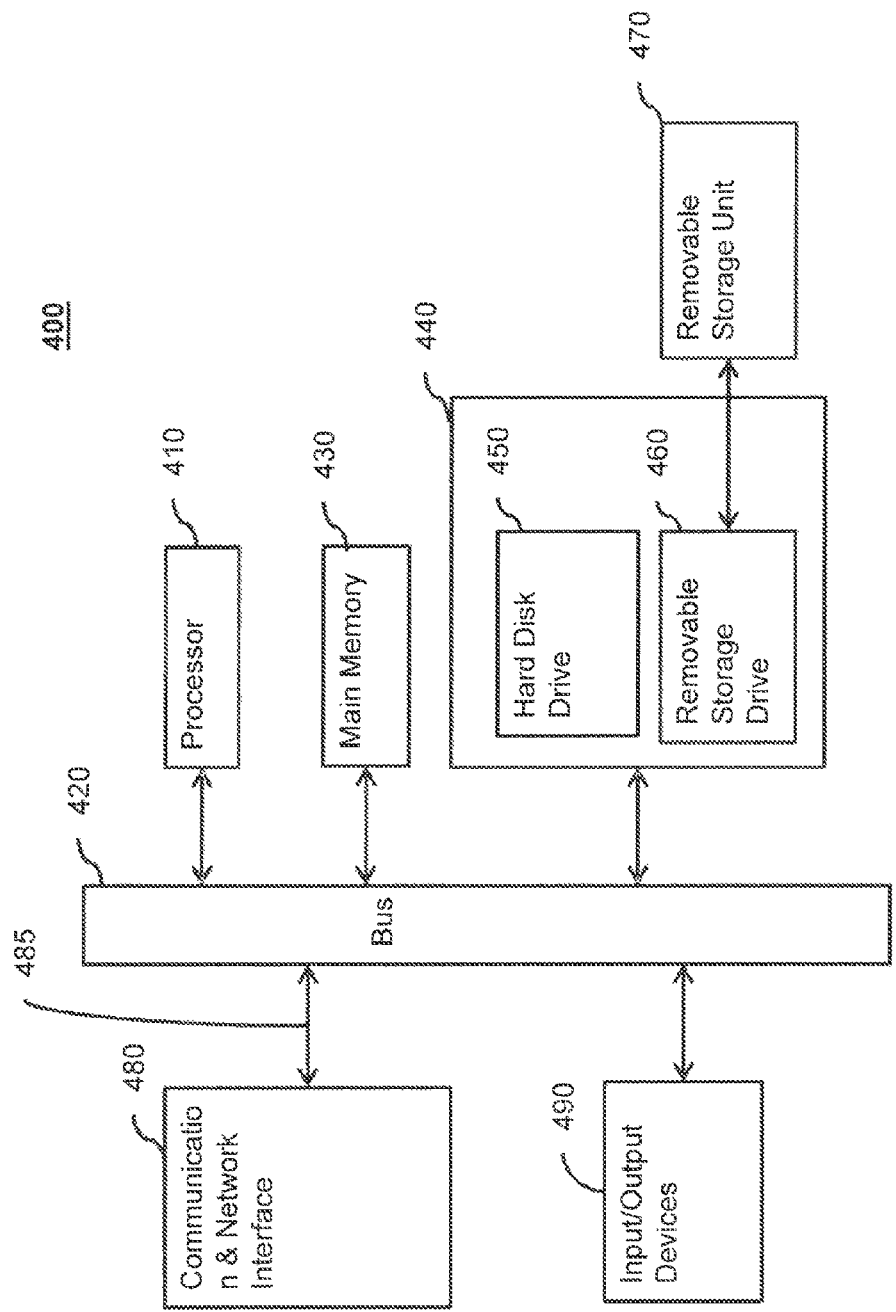
FIG. 4 depicts an example computer system in which embodiments of the invention can be implemented.

Various aspects of the invention can be implemented by software, firmware, hardware, or a combination thereof. FIG. 4 illustrates an example computer system 400 in which the invention, or portions thereof, can be implemented as computer-readable code. For example, the methods illustrated by flowcharts described herein can be implemented in one or more systems 400. Various embodiments of the invention are described in terms of this example computer system 400. After reading this description, it will become apparent to a person skilled in the relevant art how to implement the invention using other computer systems and/or computer architectures.

Computer system 400 includes one or more processors, such as processor 410. Processor 410 can be a special purpose or a general purpose processor. Processor 410 is connected to a communication infrastructure 420 (for example, a bus or network).

Computer system 400 also includes a main memory 430, preferably random access memory (RAM), and may also include a secondary memory 440. Secondary memory 440 may include, for example, a hard disk drive 450, a removable storage drive 460, and/or a memory stick. Removable storage drive 460 may comprise a floppy disk drive, a magnetic tape drive, an optical disk drive, a flash memory, or the like. The removable storage drive 460 reads from and/or writes to a removable storage unit 470 in a well known manner. Removable storage unit 470 may comprise a floppy disk, magnetic tape, optical disk, etc. which is read by and written to by removable storage drive 460. As will be appreciated by persons skilled in the relevant art(s), removable storage unit 470 includes a computer usable storage medium having stored therein computer software and/or data.

In alternative implementations, secondary memory 440 may include other similar means for allowing computer programs or other instructions to be loaded into computer system 400. Such means may include, for example, a removable storage unit 470 and an interface (not shown). Examples of such means may include a program cartridge and cartridge interface (such as that found in video game devices), a removable memory chip (such as an EPROM, or PROM) and associated socket, and other removable storage units 470 and interfaces which allow software and data to be transferred from the removable storage unit 470 to computer system 400.

Computer system 400 may also include a communications and network interface 480. Communications interface 480 allows software and data to be transferred between computer system 400 and external devices. Communications interface 480 may include a modem, a communications port, a PCM-CIA slot and card, or the like. Software and data transferred via communications interface 480 are in the form of signals which may be electronic, electromagnetic, optical, or other signals capable of being received by communications interface 480. These signals are provided to communications interface 480 via a communications path 485. Communications path 485 carries signals and may be implemented using wire or cable, fiber optics, a phone line, a cellular phone link, an RF link or other communications channels.

The network interface 480 allows the computer system 400 to communicate over communication networks or mediums such as LANs, WANs the Internet, etc. The network interface 480 may interface with remote sites or networks via wired or wireless connections.

In this document, the terms "computer program medium" and "computer usable medium" and "computer readable medium" are used to generally refer to media such as removable storage unit 470, removable storage drive 460, and a hard disk installed in hard disk drive 450. Signals carried over communications path 485 can also embody the logic described herein. Computer program medium and computer usable medium can also refer to memories, such as main memory 430 and secondary memory 440, which can be memory semiconductors (e.g. DRAMs, etc.). These computer program products are means for providing software to computer system 400.

Computer programs (also called computer control logic) are stored in main memory 430 and/or secondary memory 440. Computer programs may also be received via communications interface 480. Such computer programs, when executed, enable computer system 400 to implement embodiments of the invention as discussed herein. In particular, the computer programs, when executed, enable processor 410 to implement the processes of the invention, such as the steps in the methods illustrated by flowcharts discussed above. Accordingly, such computer programs represent controllers of the computer system 400. Where the invention is implemented using software, the software may be stored in a computer program product and loaded into computer system 400 using removable storage drive 460, interfaces, hard drive 450 or communications interface 480, for example.

The computer system 400 may also include input/output/display devices 490, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

Figure 5:
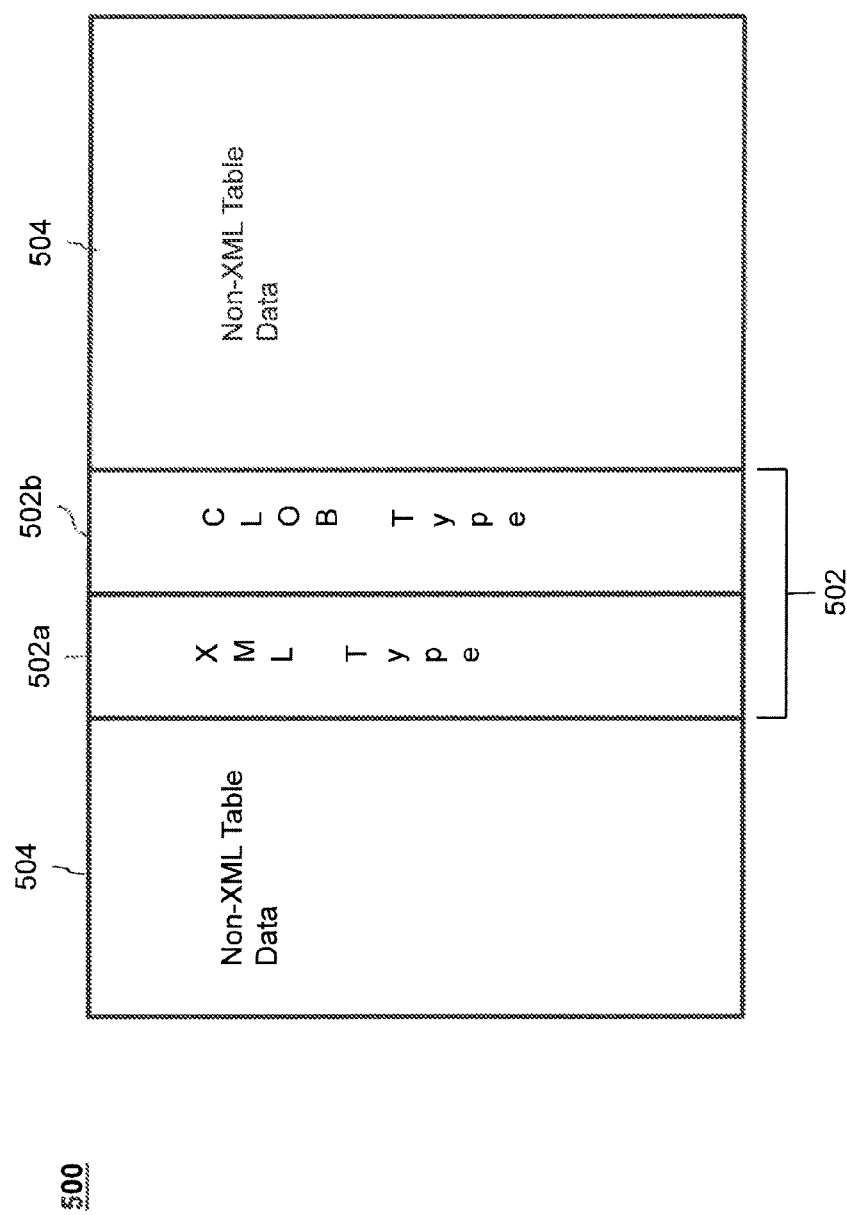
FIG. 5 depicts a table containing an XML-type column according to an embodiment of the invention.
Figure 6:
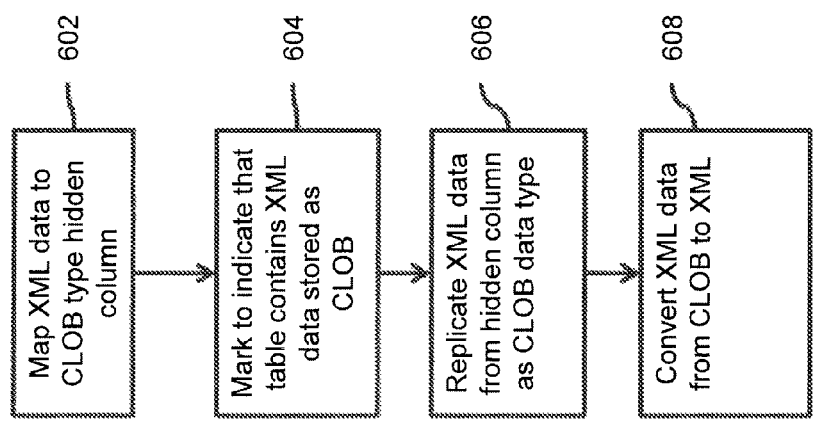
FIG. 6 is a flow chart representing replicating structured data from a primary database to a replicate database according to an embodiment of the invention.

FIGS. 5 and 6 relate to a specific embodiment of the present invention concerning XML data. FIG. 5 graphically depicts a database table that contains a column of XML type. As shown in FIG. 5, the table 500 contains unstructured table data 504 as well as a column of XML type data 502. A column of XML type data 502 may be arranged to have a first "visible" XML column 502a and to have a second opaque or "hidden" column 502b that is of an unstructured type—e.g., CLOB, as shown in FIG. 5. When such a "hidden column" arrangement is employed, replication can be carried out by capitalizing on the fact that the XML column contains a user-accessible (albeit "hidden") CLOB column 502b. Replication using the hidden column is depicted in FIG. 6.

As shown in FIG. 6, the XML type data is mapped directly to its corresponding hidden column, where it is stored as CLOB type data at step 602. The column can then be marked to indicate that it contains XML data stored as CLOB at step 604. The hidden CLOB table can then be replicated directly to the replicate database at step 606. According to some embodiments of the present invention, in step 608 the data is converted back to XML type if the replicate database 110 supports the type.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method of replicating data of a structured data type and stored in a primary database to a replicate database, comprising:
    identifying, using one or more processors, data stored on said primary database that is marked for replication to the replicate database, wherein the identified data is of the structured data type;
    generating, using one or more processors, a replication definition correlating the structured data type to an unstructured data type, wherein the correlating includes a conversion of the structured data type to an unstructured data type;
    mapping, using one or more processors, the identified data to the unstructured data type using the replication definition, wherein the mapping includes storing the structured data in a hidden column; and
    sending, using one or more processors, the mapped data to the replicate database in a data column of the unstructured data type as a log transfer language (LTL) message.

2. The method of claim 1, wherein the structured data type comprises an extensible markup language (XML) data type.

3. The method of claim 1, wherein the unstructured data type comprises one of text, large object (LOB), and character large object (CLOB) data type.

4. The method of claim 1, further comprising generating the LTL message and sending the LTL message to the replicate database.

5. The method of claim 1, further comprising causing the replicate database to update a database table based on the replicated data.

6. The method of claim 5, further comprising marking the database table to indicate that the database table contains structured data.

7. The method of claim 1, wherein the mapping is in response to identifying that the identified data is to be replicated.

8. The method of claim 1, wherein the mapping includes converting the identified data to unstructured data.

9. The method of claim 1, wherein generating the replication definition comprises automatically generating the replication definition.

10. A replication system for replicating a data of a structured data type stored in a primary database to a replicate database, comprising:
    a database reader executable in one or more computer processors and configured to identify data to be replicated from the primary database, the data being stored as a structured data type, wherein the identified data is of the structured data type;
    a data mapper, executable on one or more computer processors, configured to;
        generate a replication definition correlating the structured data type to an unstructured data type, wherein the correlating includes a conversion of the structured data type to an unstructured data type,
        map the identified data to the unstructured data type using the replication definition, and
        store the structured data in a hidden column; and a transfer interface, executable on one or more computer processors, configured to send the mapped data to the replicate database in a data column of the unstructured data type as a log transfer language (LTL) message.

11. The replication system of claim 10, wherein the structured data type comprises an extensible markup language (XML) data type.

12. The replication system of claim 10, wherein the unstructured data type comprises one of text, large object (LOB), and character large object (CLOB) data type.

13. The replication system of claim 10, wherein the transfer interface is further configured to generate the LTL message and send the LTL message to the replicate database.

14. The replication system of claim 10, wherein the data mapper is further configured to map the identified data in response to identifying that the identified data is to be replicated.

15. The replication system of claim 10, wherein the data mapper is further configured to map the identified data by converting the identified data to unstructured data.

16. The replication system of claim 10, wherein the data mapper is configured to automatically generate the replication definition.

17. A non-transitory computer readable storage medium having instructions stored thereon that, when executed by a processor, cause the processor to perform operations comprising:

identifying data that is marked for replication from a primary database to a replicate database, wherein the data is stored as a structured data type;

generating a replication definition correlating the structured data type to an unstructured data type, wherein the correlating includes converting the structured data type to an unstructured data type;

mapping the identified data to the unstructured data type using a replication definition, wherein the correlating includes a conversion of the structured data type to an unstructured data type;

sending the mapped data to a replicate database in a data column of the unstructured data type as a log transfer language (LTL) message.

18. The computer readable medium of claim 17, wherein the structured data type comprises an extensible markup language (XML) data type.

19. The computer readable medium of claim 17, wherein the unstructured data type comprises one of text, large object (LOB), and character large object (CLOB) data type.

20. The computer readable medium of claim 17, wherein the sending includes generating the LTL message and sending the LTL message to the replicate database.

21. The computer readable medium of claim 17, wherein the mapping is in response to identifying that the identified data is to be replicated.

22. The computer readable medium of claim 17, wherein the mapping includes converting the identified data to unstructured data.

23. The computer readable medium of claim 17, wherein generating the replication definition comprises automatically generating the replication definition.

* * * * *